(12) United States Patent
Bunker et al.

(10) Patent No.: US 10,472,972 B2
(45) Date of Patent: Nov. 12, 2019

(54) THERMAL MANAGEMENT OF CMC ARTICLES HAVING FILM HOLES

(71) Applicant: General Electric Company, Schenectady, NY (US)

(72) Inventors: Ronald Scott Bunker, West Chester, OH (US); Kevin Robert Feldmann, Mason, OH (US); Robert Charles Groves, II, West Chester, OH (US)

(73) Assignee: General Electric Company, Schenectady, NY (US)

( * ) Notice: Subject to any disclaimer, the term of this patent is extended or adjusted under 35 U.S.C. 154(b) by 785 days.

(21) Appl. No.: 14/955,261

(22) Filed: Dec. 1, 2015

(65) Prior Publication Data

US 2017/0152749 A1  Jun. 1, 2017

(51) Int. Cl.
*C23C 28/02* (2006.01)
*F01D 5/18* (2006.01)
(Continued)

(52) U.S. Cl.
CPC ............ *F01D 5/186* (2013.01); *C23C 28/321* (2013.01); *C23C 28/345* (2013.01); *F01D 5/288* (2013.01);
(Continued)

(58) Field of Classification Search
CPC ..... C23C 28/321; C23C 28/345; F01D 5/186; F01D 5/288; F01D 9/065; F23R 3/007; F23R 3/06; F23R 2900/03042; F05D 2230/30; F05D 2230/90; F05D 2260/202; F05D 2300/15; F05D 2300/211;
(Continued)

(56) References Cited

U.S. PATENT DOCUMENTS 4,529,357 A   7/1985  Holland
5,771,577 A   6/1998  Gupta et al.
(Continued)

FOREIGN PATENT DOCUMENTS

CN    1670337 A    9/2005
CN  101429893 A    5/2009
(Continued)

OTHER PUBLICATIONS

Extended European Search Report and Opinion issued in connection with corresponding EP Application No. 16201013.6 dated Mar. 31, 2017.
(Continued)

*Primary Examiner* — Travis M Figg
(74) *Attorney, Agent, or Firm* — Dority & Manning, P.A.

(57) ABSTRACT

Engine components are provided for a gas turbine engines that generate a hot combustion gas flow. The engine component can include a substrate constructed from a CMC material and having a hot surface facing the hot combustion gas flow and a cooling surface facing a cooling fluid flow. The substrate generally defines a film hole extending through the substrate and having an inlet provided on the cooling surface, an outlet provided on the hot surface, and a passage connecting the inlet and the outlet. The engine component can also include a coating on at least a portion of the hot surface and on at least a portion of an inner surface defined within the passage.

20 Claims, 5 Drawing Sheets

(51) Int. Cl.
  *F01D 9/06* (2006.01)
  *F23R 3/00* (2006.01)
  *F23R 3/06* (2006.01)
  *F01D 5/28* (2006.01)
  *C23C 28/00* (2006.01)

(52) U.S. Cl.
  CPC ............. *F01D 9/065* (2013.01); *F23R 3/007* (2013.01); *F23R 3/06* (2013.01); *F05D 2230/30* (2013.01); *F05D 2230/90* (2013.01); *F05D 2260/202* (2013.01); *F05D 2300/15* (2013.01); *F05D 2300/211* (2013.01); *F05D 2300/5024* (2013.01); *F05D 2300/6033* (2013.01); *F23R 2900/03042* (2013.01); *Y02T 50/672* (2013.01); *Y02T 50/676* (2013.01); *Y02T 50/6765* (2018.05)

(58) Field of Classification Search
  CPC ..... F05D 2300/5024; F05D 2300/6033; Y02T 50/672; Y02T 50/676
  See application file for complete search history.

(56) References Cited

U.S. PATENT DOCUMENTS

| | | | |
|---|---|---|---|
| 6,339,879 | B1 | 1/2002 | Wheat et al. |
| 6,365,013 | B1 | 4/2002 | Beele |
| 6,544,346 | B1 | 4/2003 | Grossklaus, Jr. et al. |
| 6,670,026 | B2 * | 12/2003 | Steibel ............... B23K 26/1476 428/293.4 |
| 6,817,833 | B2 | 11/2004 | Haselbach |
| 6,881,439 | B2 | 4/2005 | Graham et al. |
| 7,622,160 | B2 | 11/2009 | Gupta et al. |
| 8,257,809 | B2 | 9/2012 | Morrison et al. |
| 2005/0220618 | A1 | 10/2005 | Zhang et al. |
| 2006/0280955 | A1 | 12/2006 | Spitsberg et al. |
| 2007/0036942 | A1 * | 2/2007 | Steele ..................... F01D 25/12 428/131 |
| 2010/0282721 | A1 * | 11/2010 | Bunker ................... F01D 25/12 219/121.61 |

FOREIGN PATENT DOCUMENTS

| | | |
|---|---|---|
| EP | 1 076 111 A2 | 2/2001 |
| EP | 1 275 747 A1 | 1/2003 |
| EP | 1 435 492 A2 | 7/2004 |
| EP | 1 632 720 A1 | 3/2006 |
| EP | 2 236 650 A1 | 10/2010 |
| EP | 2 248 997 A2 | 11/2010 |
| EP | 2 458 028 A2 | 5/2012 |
| EP | 2 808 418 A2 | 12/2014 |
| WO | 97/05299 A1 | 2/1997 |
| WO | 2015/065587 A1 | 5/2015 |

OTHER PUBLICATIONS

Machine translation and First Office Action and Search issued in connection with corresponding CN Application No. 201611090122.X dated Dec. 28, 2017.

* cited by examiner

US 10,472,972 B2

THERMAL MANAGEMENT OF CMC ARTICLES HAVING FILM HOLES

FIELD OF THE INVENTION

The present invention relates generally to ceramic matrix turbine engine components, and more particularly, to a ceramic matrix composite gas turbine engine component having small complex features.

BACKGROUND OF THE INVENTION

In order to increase the efficiency and the performance of gas turbine engines so as to provide increased thrust-to-weight ratios, lower emissions and improved specific fuel consumption, engine turbines are tasked to operate at higher temperatures. The higher temperatures reach and surpass the limits of the material of the components in the hot section of the engine and in particular the turbine section of the engine. Since existing materials cannot withstand the higher operating temperatures, new materials for use in high temperature environments need to be developed.

As the engine operating temperatures have increased, new methods of cooling the high temperature alloys comprising the combustors and the turbine airfoils have been developed. For example, ceramic thermal barrier coatings (TBCs) have been applied to the surfaces of components in the stream of the hot effluent gases of combustion to reduce the heat transfer rate, provide thermal protection to the underlying metal and allow the component to withstand higher temperatures. These improvements help to reduce the peak temperatures and thermal gradients of the components. Cooling holes have been also introduced to provide film cooling to improve thermal capability or protection. Simultaneously, ceramic matrix composites have been developed as substitutes for the high temperature alloys. The ceramic matrix composites (CMCs) in many cases provide an improved temperature and density advantage over metals, making them the material of choice when higher operating temperatures and/or reduced weight are desired.

CMCs have relatively low thermal conductivities and are thus well suited for use in high temperature environments for long periods of time. CMC components in the hot gas are heavily film cooled, particularly in designs with otherwise uncooled trailing edges. However, improved film cooling performance can decrease the required cooling film flow and/or increase the durability of the CMC component.

BRIEF DESCRIPTION OF THE INVENTION

Aspects and advantages of the invention will be set forth in part in the following description, or may be obvious from the description, or may be learned through practice of the invention.

Engine components are generally provided for a gas turbine engines that generate a hot combustion gas flow. In one embodiment, the engine component includes a substrate constructed from a CMC material and having a hot surface facing the hot combustion gas flow and a cooling surface facing a cooling fluid flow. The substrate generally defines a film hole extending through the substrate and having an inlet provided on the cooling surface, an outlet provided on the hot surface, and a passage connecting the inlet and the outlet. The engine component also includes a coating on at least a portion of the hot surface and on at least a portion of an inner surface defined within the passage.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Figure 1:
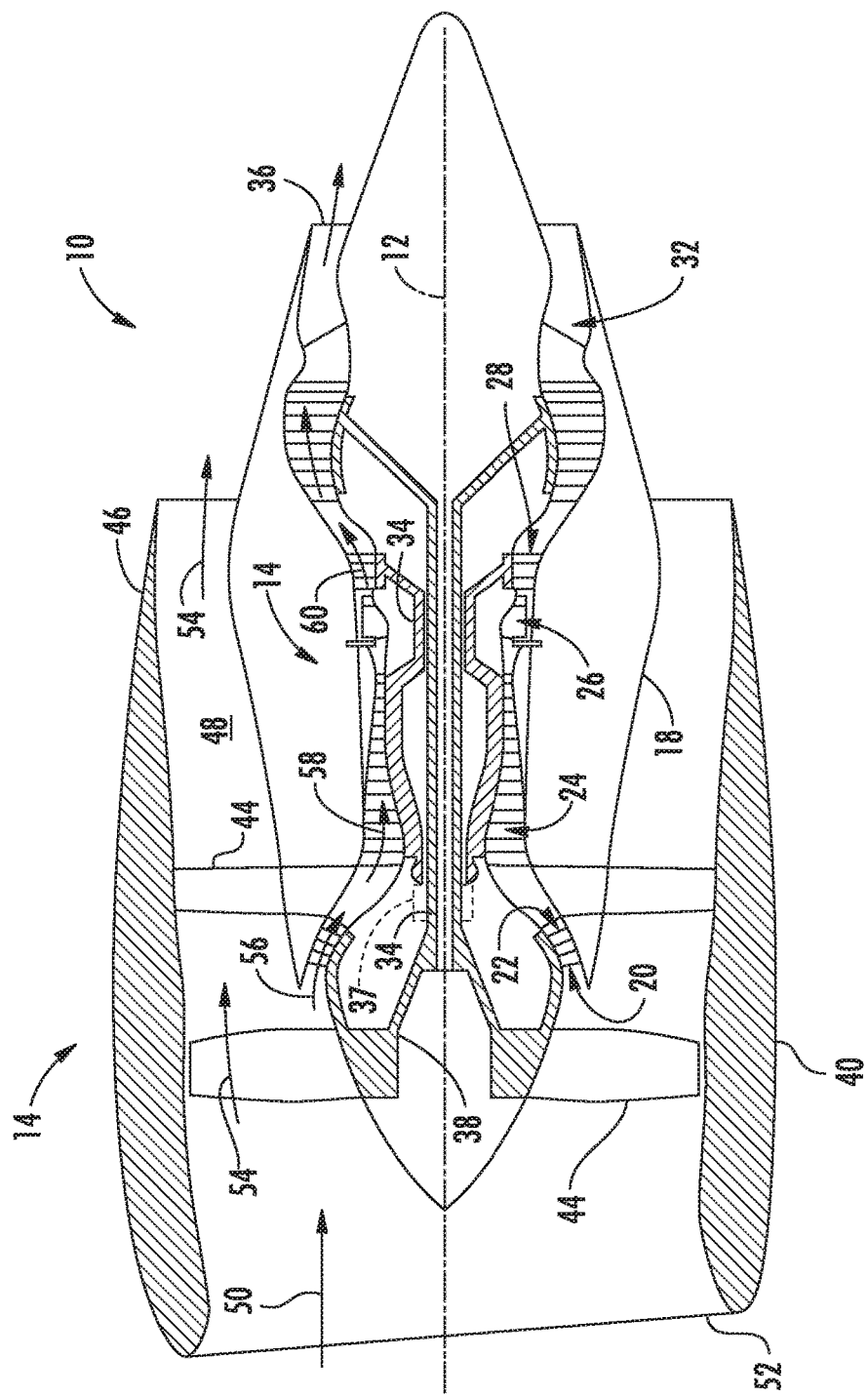
FIG. 1 shows a cross-sectional view of one embodiment of a gas turbine engine that may be utilized within an aircraft in accordance with aspects of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the phrases "constructed of CMCs" and "comprised of CMCs" shall mean components substantially constructed of CMCs. More specifically, the CMC components shall include more CMC material than just a layer or coating of CMC materials. For example, the components constructed of CMCs may be comprised or constructed substantially or entirely of CMC materials, including greater than about 50, 60, 70, 80, 90, or 100 percent CMC material.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a booster compressor 22 for increasing the pressure of the air that enters the core engine 14 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure, HP) turbine 28 for driving the high pressure compressor 24 via a first (high pressure, HP) drive shaft 30, and then to a second (low pressure, LP) turbine 32 for driving the booster compressor 22 and fan section 16 via a second (low pressure, LP) drive shaft 34 that is generally coaxial with first drive shaft 30. After driving each of turbines 28 and 32, the combustion products may be expelled from the core engine 14 via an exhaust nozzle 36 to provide propulsive jet thrust.

It should be appreciated that each turbine 28, 30 may generally include one or more turbine stages, with each stage including a turbine nozzle and a downstream turbine rotor. As will be described below, the turbine nozzle may include a plurality of vanes disposed in an annular array about the centerline axis 12 of the engine 10 for turning or otherwise directing the flow of combustion products through the turbine stage towards a corresponding annular array of rotor blades forming part of the turbine rotor. As is generally understood, the rotor blades may be coupled to a rotor disk of the turbine rotor, which is, in turn, rotationally coupled to the turbine's drive shaft (e.g., drive shaft 30 or 34).

Additionally, as shown in FIG. 1, the fan section 16 of the engine 10 may generally include a rotatable, axial-flow fan rotor 38 that configured to be surrounded by an annular fan casing 40. In particular embodiments, the (LP) drive shaft 34 may be connected directly to the fan rotor 38 such as in a direct-drive configuration. In alternative configurations, the (LP) drive shaft 34 may be connected to the fan rotor 38 via a speed reduction device 37 such as a reduction gear gearbox in an indirect-drive or geared-drive configuration. Such speed reduction devices may be included between any suitable shafts/spools within engine 10 as desired or required.

It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

Figure 2:
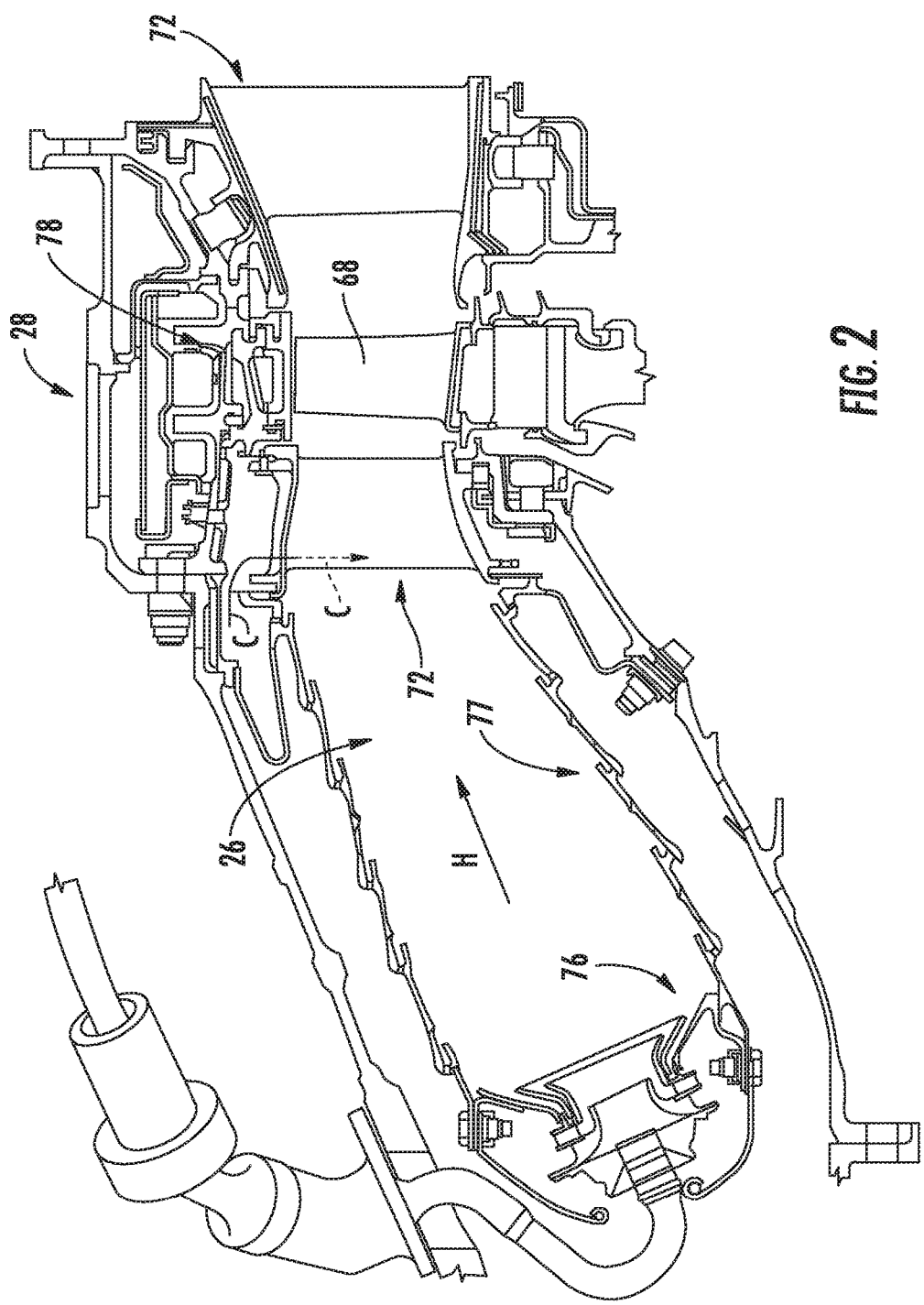
FIG. 2 shows a side section view of an exemplary combustor and a high pressure turbine of the engine from FIG. 1.

FIG. 2 is a side section view of the combustor 26 and first turbine 28 (i.e., the high pressure (HP) turbine) of the engine 10 from FIG. 1. The combustor 26 includes a deflector 76 and a combustor liner 77. Adjacent to the turbine blade 68 of the turbine 28 in the axial direction are sets of axially-spaced, static turbine vanes 72, with adjacent vanes 72 forming nozzles therebetween. The nozzles turn combustion gas to better flow into the rotating blades so that the maximum energy may be extracted by the turbine 28. A cooling fluid flow C passes through the vanes 72 to cool the vanes 72 as hot combustion gas flow H passes along the exterior of the vanes 72. A shroud assembly 78 is adjacent to the rotating blade 68 to minimize flow loss in the turbine 28. Similar shroud assemblies can also be associated with the LP turbine 32, the LP compressor 22, or the HP compressor 24.

One or more of the engine components of the engine 10 includes a film-cooled substrate in which a film hole of an embodiment disclosed further herein may be provided. Some non-limiting examples of the engine component having a film-cooled substrate can include the blades 68, vanes or nozzles 72, combustor deflector 76, combustor liner 77, or shroud assembly 78, described in FIGS. 1-2. Other non-limiting examples where film cooling is used include turbine transition ducts and exhaust nozzles.

Figure 3:
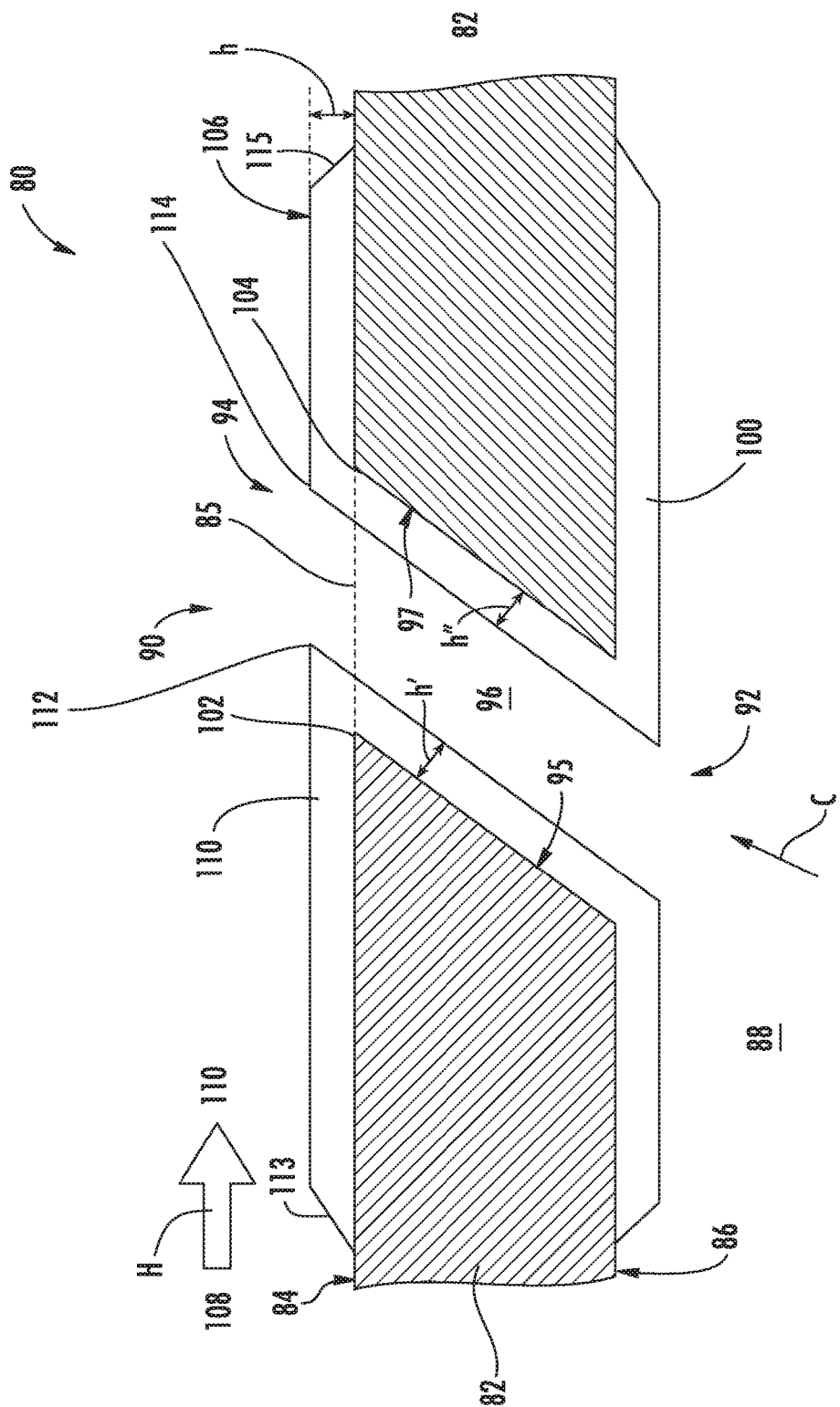
FIG. 3 is a schematic, sectional view through a film hole of an exemplary engine component of the engine from FIG. 1 according to one embodiment.
Figure 4:
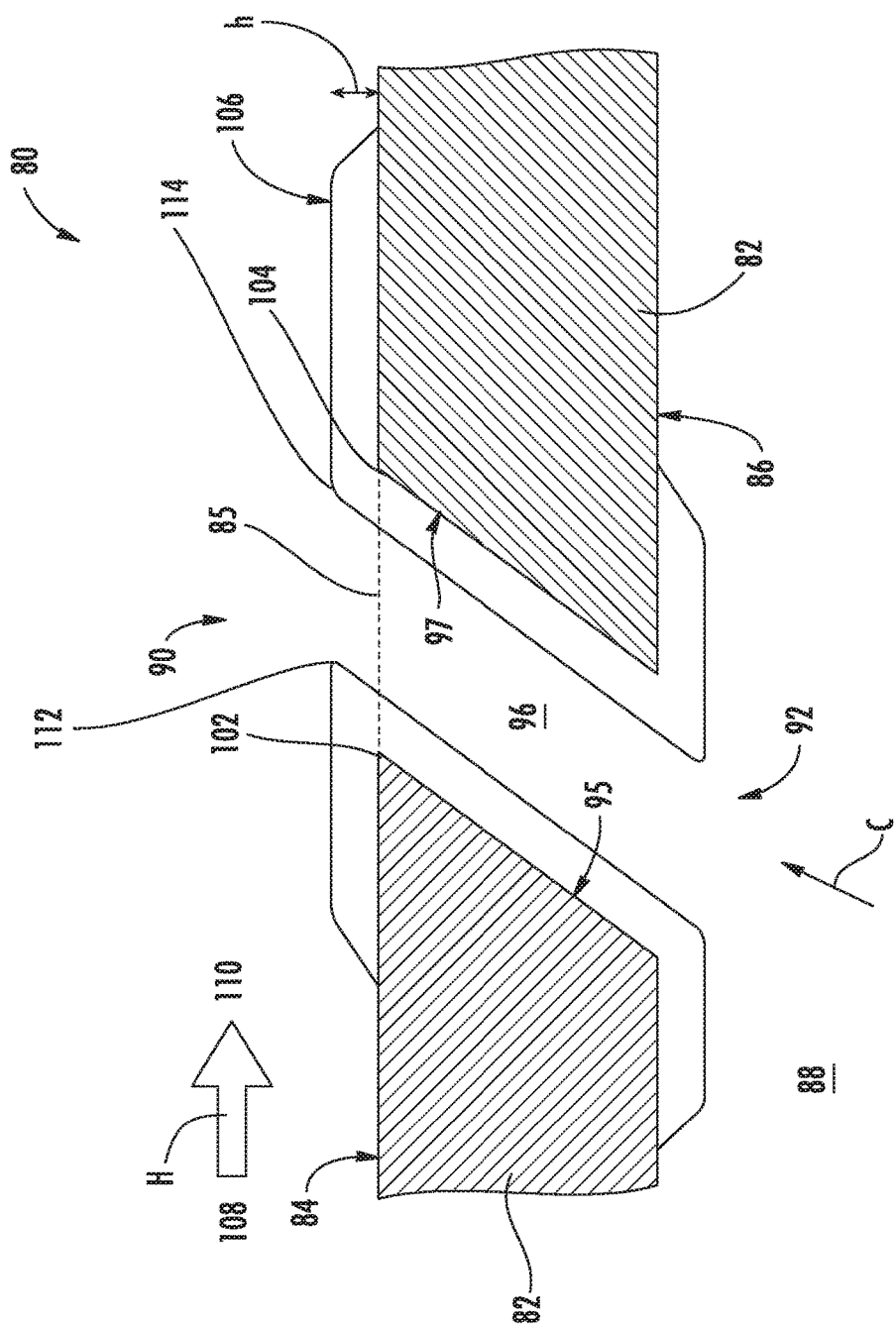
FIG. 4 is a schematic, sectional view through a film hole of another exemplary engine component of the engine from FIG. 1 according to one embodiment.

FIGS. 3 and 4 are a schematic, sectional view showing a respective portion of exemplary engine components 80 formed from a CMC substrate 82 defining at least one film hole 90 defined therein. The engine component 80 may be an engine component of the engine 10 from FIG. 1, and can be disposed in a flow of hot gas represented by arrow H. A cooling fluid flow, represented by arrow C may be supplied to cool the engine component. As discussed above with respect to FIGS. 1-2, in the context of a turbine engine, the cooling air can be first compressed air flow 54 which bypasses the engine core 14, fluid from the LP compressor 22, or fluid from the HP compressor 24.

The engine component 80 includes a substrate 82 having a hot surface 84 facing the hot combustion gas flow H and a cooling surface 86 facing the cooling fluid C. The substrate 82 may form a wall of the engine component 80; the wall may be an exterior or interior wall of the engine component 80. No matter the location or type of component within the engine, the hot surface 84 of the substrate 82 is exposed to hot gasses within the engine. The first engine component 80 can define at least one interior cavity or channel 88 comprising the cooling surface 86. The hot surface 84 may be an exterior surface of the engine component 80. In the case of a gas turbine engine, the hot surface 84 may be exposed to gases having temperatures in the range of 1000° C. to 2000° C. Suitable materials for the substrate 82 include, but are not limited to, steel, refractory metals such as titanium, or superalloys based on nickel, cobalt, or iron, and ceramic matrix composites. The superalloys can include those in equi-axed, directionally solidified, and single crystal structures.

In one particular embodiment, the substrate 82 is constructed from a ceramic matrix composite (CMC) material, which is a non-metallic material having high temperature capability. Exemplary CMC materials utilized for such substrate 82 may include silicon carbide, silicon, silica or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y and combinations thereof) and inorganic fillers (e.g., pyrophyllite, wollastonite, mica, talc, kyanite and montmorillonite). In one embodiment, the CMC material is formed from a plurality of layers (e.g., about 4 to about 10 layers) in its thickness.

The CMC material is formed into plies of material having thicknesses of about 25 μm to about 475 μm, and most typically about 125 to about 400 inches. The thicknesses of the plies are usually dictated by the size of the fiber tows (filament bundles) selected for use, and the thicknesses of the plies may vary with fiber diameter. For most of the applications considered herein, the plies are formed as two-dimensional woven fabric, although one-dimensional fiber orientation may also be used. However, the method of manufacturing the plies, laying up the plies to form the component part and other parts manufacturing technology used in the composite industry are not meant to limit the present invention. The plies are laid up to form the shape of the article being formed, the angles of the adjacent plies may vary depending on the planar strength required. The components that can be made using these CMC materials include but are not limited to turbine blades, turbine vanes, turbine shrouds, and combustor liners, casings, heat shields and diffusers. These hot section components all benefit from the use of cooling air to provide sufficient cooling to accomplish heat transfer during engine operation, thereby extending their range of use.

Figure 6:
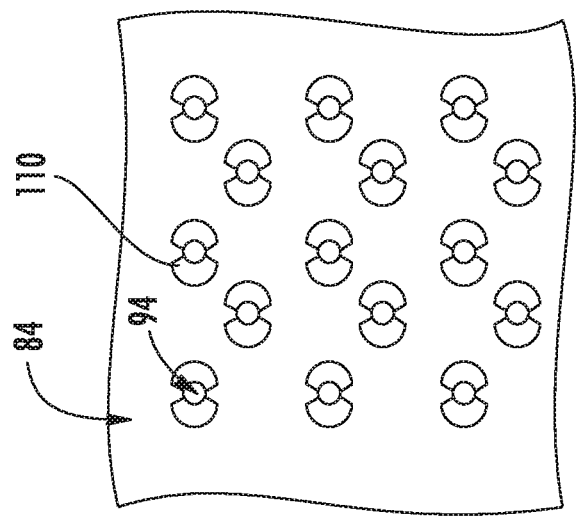
FIG. 6 is top view of a plurality of film holes on another exemplary engine compound according to one embodiment.
Figure 5:
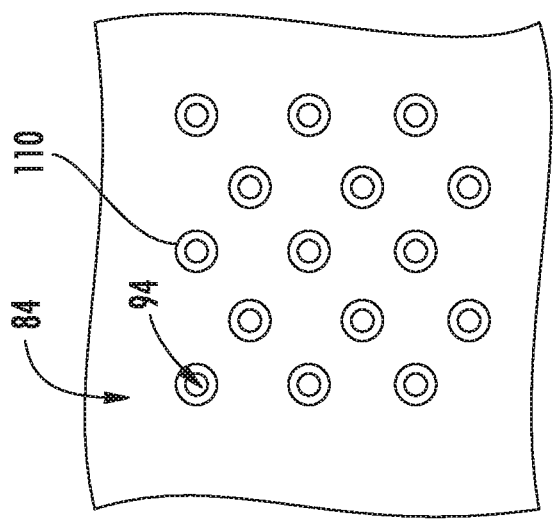
FIG. 5 is top view of a plurality of film holes on an exemplary engine compound according to one embodiment.

The engine component 80 further includes one or more film hole(s) 90 defined by the substrate 82 and extending through the substrate 82 that provide fluid communication between the interior cavity 88 and the hot surface 84 of the engine component 80. The film hole 90 has an inlet 92 provided on the cooling surface 86 of the substrate 82, an outlet 94 provided on the hot surface 84, and a passage 96 connecting the inlet 92 and the outlet 94. The passage 96 is generally defined between the upstream inner surface 95 and the downstream inner surface 97 within the passageway 96. While only one film hole 90 is shown in FIG. 3, it is understood that the engine component 80 may be provided with multiple film holes 90, which be arranged in any desired configuration on the engine component 80 (such as shown in FIGS. 5 and 6).

It is noted that, in any of the embodiments discussed herein, although the substrate 82 is shown as being generally planar, it is understood that that the substrate 82 may be curved for many engine components 80. However, the curvature of the substrate 82 may be slight in comparison to the size of the film hole 90, and so for the purposes of discussion and illustration, the substrate 82 is shown as planar. Whether the substrate 82 is planar or curved local to the film hole 90, the hot and cooling surfaces 84, 86 may be parallel to each other as shown herein, or may lie in non-parallel planes.

During operation, the cooling fluid flow C is supplied to the interior cavity 88, into the inlet 92, through the passageway 96 of the film hole 90, and out of the outlet 94 to create a thin layer or film of cool fluid (for example, air drawn from the compressor) over the hot surface 84, protecting it from the hot combustion gas flow H. However, the film hole 90 has a relatively high heat transfer coefficient on the upstream inner surface 95 and the downstream inner surface 97, which can lead to the film hole 90 acting as an intense heat sink. However, since the CMC material has a much lower thermal conductivity than metal (e.g., about half), the film hole 90 and the flow within substantially increases thermal gradients produced within the CMC locally, leading to thermal stresses within the CMC substrate 82.

FIGS. 3 and 4 show a low conductivity coating 110 on at least a portion of the upstream inner surface 95 and the downstream inner surface 97. In certain embodiments, the low conductivity coating 110 can be a thermal barrier coating (TBC) or an environmental barrier coating (EBC). For example, the low conductivity coating 110 can include a plurality of layers. For example, the EBC can include a bond coat (e.g., comprising silicon or silica), one or more layers formed from one or more rare earth silicates (e.g., one or more of a mullite layer, a mullite-alkaline earth aluminosilicate mixture layer, an yttrium monosilicate (YMS) layer, an ytterbium doped yttrium disilicate (YbYDS) layer, a barium strontium aluminosilicate (BSAS) layer, etc.), etc. The low conductivity coating 110 is over any other coating (e.g., EBC and/or TBC) that may be on the hot surface 84 of the substrate 82.

The low conductivity coating 110 can have a thermal conductivity that is at least about 10 times less than the thermal conductivity of the CMC substrate 100 so as to inhibit the formation of thermal stresses within the substrate 100. That is, the thermal conductivity of the CMC substrate is 10 times greater (or more) than the thermal conductivity of the coating 110. For example, the low conductivity coating 110 can have a thermal conductivity that is at least about 50 times less than the thermal conductivity of the CMC substrate 100. That is, the thermal conductivity of the CMC substrate is 50 greater (or more) than the thermal conductivity of the coating 110. As such, the coating 110 can protect the underlying CMC substrate 100, particularly in and around the film hole, from forming a significant local temperature gradient therein.

As shown in FIGS. 3 and 4, the low conductivity coating 110 is positioned on at least a portion of the hot surface 84 of the substrate 82, on at least a portion of the inner surface 95, 97 defined within the passage (e.g., at least a portion of the upstream inner surface 95 and/or at least a portion of the downstream inner surface 97), and/or on at least a portion of the cold surface 86 of the substrate 82. Although shown on a portion of the hot surface 84 of the substrate 82, on the entire inner surface 95, 97 within the passage, and on a portion of the cold surface 86, the low conductivity coating 110 can be applied as desired on each of the respective surfaces 84, 86, 95, 97 (entirely or partially). For example, the low conductivity coating 110 can extend on the upstream inner surface 95 and/or the downstream inner surface 97 from the outlet 94 to the inlet 92. In one particular embodiment, the coating 110 completely covers all surfaces defined within the passage.

The low conductivity coating 110 extends, in one embodiment, around at least 50% of an upstream edge 102 of the outlet 94 (e.g., around at least 75% of the upstream edge of the outlet), such as shown in FIG. 6. Similarly, the low conductivity coating 110 can extend, in one embodiment, around at least 50% of a downstream edge 104 of the outlet 94 (e.g., around at least 75% of the downstream edge of the outlet). For example, the low conductivity coating 110 perimetrically surrounds the outlet 94 defined in the hot surface 84, as shown in FIG. 5. Similarly, the low conductivity coating 110 perimetrically surrounds around the inlet 96 defined in the cold surface 86.

In certain embodiments, the coating 110 can be an extension of any or all layers of a thermal barrier coating (TBC), an environmental barrier coating, an adhesion compliance coating, etc. that extends across the entire hot surface 84. However, in other embodiments, the low conductivity coating 110 can extend only partially from the film hole. For example, the low conductivity coating 110 can have an average length extending away from respective film hole edge (e.g., the upstream edge 102 and/or the downstream edge 104) that is about 0.5 times to about 10 times (e.g., about 0.5 times to about 5 times) the outlet diameter in a direction of the hot combustion gas flow H measured from an upstream inner surface 102 to a downstream inner surface 104. As shown in the exemplary embodiments of FIGS. 3 and 4, the outer ends 113, 115 (away from the respective film hole edge) of the low conductivity coating 110 are tapered to the hot surface 84 so as to lessen any impact on the airflow across the film hole 90. However, in other embodiments, the outer ends 113, 115 may have a different orientation with respect to the outer surface 84, such as perpendicular to the hot surface 84, curved, stepped, etc.

Similarly, the coating 110 can extend across the entire cooling surface 86, or can extend only partially from the inlet 92 of the film hole 90. For example, the low conductivity coating 110 can have an average length extending away from respective film hole edge of the inlet 92 (e.g., the upstream edge and/or the downstream edge) that is about 0.5 times to about 10 times (e.g., about 0.5 times to about 5 times) the inlet diameter in a direction of the hot combustion gas flow H measured from an upstream inner surface to a downstream inner surface. As shown in the exemplary embodiments of FIGS. 3 and 4, the outer ends can be tapered to the cooling surface 86 or may have a different orientation with respect to the cooling surface 86, such as perpendicular to the cooling surface 86, curved, stepped, etc.

The low conductivity coating 110 has, in particular embodiments, a thickness on the respective surface of the substrate 82 that is about 10 μm to about 1500 μm, but may vary in thickness depending on the location of the coating. For example, the low conductivity coating 110, in one embodiment, has a thickness h on the hot surface 84 that is defined from an external surface 106 of the low conductive coating 110 to the hot surface 84 of the substrate 82 in a direction perpendicular to hot combustion gas flow H. In one embodiment, the thickness h is about 1500 μm or less, preferably about 25 μm to about 500 μm. The thickness h', h" on the inner surfaces 95, 97, respectively, within the film hole 90 is, in most embodiments, about 10 μm to about 130 μm. As such, in one particular embodiment, the thickness h of the low conductivity coating 110 on the hot surface 84 is greater than the thickness h', h" on the inner surfaces 95, 97.

The film holes 90 can have any shape as desired, such as a tapered cross-section (e.g., expanding or contracting). Additionally, the film holes 90 can include any features therein, such as including a metering section (for metering of the mass flow rate of the cooling fluid flow C) and a diffusing section (in which the cooling fluid C may expand to form a wider cooling film), and/or other features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed:

1. An engine component for a gas turbine engine generating hot combustion gas flow, comprising:
   a substrate constructed from a ceramic matrix composite (CMC) material and having a hot surface facing the hot combustion gas flow and a cooling surface facing a cooling fluid flow, wherein the substrate defines a film hole extending through the substrate and having an inlet provided on the cooling surface, an outlet provided on the hot surface, and a passage defined at least in part by an inner surface and connecting the inlet and the outlet; and
   a coating having a thermal conductivity that is less than a thermal conductivity of the CMC substrate, wherein the coating is on at least a portion of the hot surface and on at least a portion of the inner surface defined within the passage.

2. The engine component as in claim 1, wherein the thermal conductivity of the CMC substrate is 10 times greater than the thermal conductivity of the coating or more.

3. The engine component as in claim 1, wherein the thermal conductivity of the CMC substrate is 100 times greater than the thermal conductivity of the coating or more.

4. The engine component as in claim 1, wherein the coating is on at least a portion of the hot surface, on at least a portion of an inner surface defined within the passage, and on at least a portion of the cold surface.

5. The engine component as in claim 2, wherein the coating has a length extending away from respective film hole edge along the cooling surface, the length being about 0.5 times to about 5 times an inlet diameter in a direction of the hot combustion gas flow.

6. The engine component as in claim 1, wherein the coating perimetrically surrounds the hot surface around the outlet defined in the hot surface.

7. The engine component as in claim 6, wherein the coating extends across the entire hot surface of the substrate.

8. The engine component as in claim 1, wherein the coating has a thickness defined from an external surface of the coating to the hot surface of the substrate in a direction perpendicular to hot combustion gas flow, the thickness being about 1000 μm or less.

9. The engine component as in claim 1, wherein the coating extends around at least 50% of a downstream edge of the outlet.

10. The engine component as in claim 1, wherein the inner surface is an upstream inner surface, wherein the engine component further comprises a downstream inner surface, and wherein the coating is over at least a portion of the upstream inner surface and at least a portion of the downstream inner surface.

11. The engine component as in claim 10, wherein the coating is on the upstream inner surface through at least 50% of the depth from the outlet to the inlet.

12. The engine component as in claim 10, wherein the coating is on the upstream inner surface through at least 75% of the depth from the outlet to the inlet.

13. The engine component as in claim 10, wherein the coating is on the upstream inner surface from the outlet to the inlet.

14. The engine component as in claim 10, wherein the coating is on the downstream inner surface through at least 50% of the depth from the outlet to the inlet.

15. The engine component as in claim 10, wherein the coating is on the downstream inner surface through at least 75% of the depth from the outlet to the inlet.

16. The engine component as in claim 10, wherein the coating is on the downstream inner surface from the outlet to the inlet.

17. The engine component as in claim 1, wherein the coating completely covers all surfaces defined within the passage.

18. The engine component as in claim 1, wherein the coating is over a thermal barrier coating forming the hot surface of the substrate.

19. A gas turbine engine comprising:
   a compressor;
   a combustor;
   a turbine;
   the engine component of claim 1.

20. The engine component as in claim 1, wherein the coating is an environmental barrier coating.

* * * * *